(12) United States Patent
Ghai et al.

(10) Patent No.: US 6,285,670 B1
(45) Date of Patent: Sep. 4, 2001

(54) TELECOMMUNICATIONS SWITCH WITH MULTIPLE PORTS FOR HOST-NODE COMMUNICATIONS

(75) Inventors: Rajat Ghai, West Yarmouth; Peter Higgins, Sandwich, both of MA (US)

(73) Assignee: Excel Switching Corporation, Hyannis, MA (US)

( * ) Notice: Subject to any disclaimer, the term of this patent is extended or adjusted under 35 U.S.C. 154(b) by 0 days.

(21) Appl. No.: 09/017,644

(22) Filed: Feb. 2, 1998

(51) Int. Cl.[7] ................................................... H04L 12/66
(52) U.S. Cl. ............................................. 370/352; 370/396
(58) Field of Search ..................................... 370/352, 362, 370/364, 384, 385, 410, 426, 424, 524, 455, 354, 396, 401, 409, 254, 395

(56) References Cited

U.S. PATENT DOCUMENTS

| | | | |
|---|---|---|---|
| 4,385,206 | * 5/1983 | Bradshaw et al. | 370/384 |
| 4,547,880 | * 10/1985 | De Vita et al. | 370/362 |
| 4,872,197 | * 10/1989 | Pemmaraju | 379/93.01 |
| 5,146,452 | 9/1992 | Pekarske | 370/16 |
| 5,544,163 | 8/1996 | Madonna | 370/60.1 |
| 5,579,384 | 11/1996 | Seymour | 379/243 |
| 5,694,547 | * 12/1997 | Subramanian et al. | 370/354 |
| 6,055,237 | * 4/2000 | Hebert et al. | 370/396 |

OTHER PUBLICATIONS

"XNL Switch and Its Control" IBM Technical Disclosure Bulletin, vol. 34, No. 8, Jan. 1, 1992, pp. 61–21, XP00030231.

Hosoya, M. et al., "Contention Solver for a superconducting packet switch" IEEE Transactions on Applied Superconductivity, vol. 7, No. 2, Jun. 1, 1997, pp. 2274–227, XP002104016.

"Arbitration for Multiprocessor Bus Switch" IBM Technical Disclosure Bulletin, vol. 36, No. 5, May 1, 1993, p. 353/354 XP000409018.

* cited by examiner

Primary Examiner—Wellington Chin
Assistant Examiner—Prenell Jones

(57) ABSTRACT

The system includes switching nodes with multiple ports for node-host communication, each port thereby connects the switching nodes to one or more hosts. One of the ports in a switching node is designated as a primary or master port and it connects the switching node to a default host. The default host controls all ports in the switching node and because applications on the default port are given the highest priority during switching node processing, the default host is useful for applications that require instant response from the switch. The other ports in the switching node are secondary ports and they connect the switching node to one or more secondary hosts simultaneously. The applications on the secondary hosts are given a lower priority than the default host's application. Therefore, the secondary hosts are useful for applications that do not require instant response from the switching nodes.

14 Claims, 2 Drawing Sheets

TELECOMMUNICATIONS SWITCH WITH MULTIPLE PORTS FOR HOST-NODE COMMUNICATIONS

TECHNICAL FIELD

This invention relates to telecommunications switching systems and specifically to a system in which each of the switching nodes has multiple ports for node-host communications.

BACKGROUND OF THE INVENTION

An example of the switching system to which the present invention applies is described in U.S. Pat. No. 5,544,163, Expandable Telecommunications System, the contents of which are incorporated herein by reference. The switching system comprises a plurality of programmable switching nodes and host software that exercises supervisory control over the switching nodes. The hosts are typically implemented as software applications running as a personal computer to provide various supervisory functions. The switching nodes are interconnected by an internodal switching network. A second network termed the "host network," interconnects the switching nodes and the host computer for supervisory communications. Examples of the host supervisory applications include call setup and teardown applications and applications that perform various system monitoring and administrative functions.

In the above-referenced patent, a single system host computer communicates with the switching nodes and all messages from the switching nodes are sent to that computer. However, in some environments the host computer may be overloaded, for example, by a high frequency of call setup and teardown operations and by other functions that may be assigned by the system operator. Moreover various nodes or groups of nodes may be situated in widely separated geographic locations and communications between a single host computer and all of the switching nodes may be substantially more expensive than distribution of the host functions on a geographic basis.

To solve these problems, a prior system divides the supervisory host applications among multiple host computers. This takes care of the host computer overload problem as well as the problem with widely separated geographic locations. However, the host applications usually have different priorities, with applications that perform call setup and teardown functions requiring the highest priority in the switching nodes. The operators of the switching system may divide the supervisory host applications among multiple host computers based on the their priorities. For example, the operator may limit to one computer host applications that control and configure various switching node features or perform call setup and teardown functions. The lower priority host applications will then be placed on other computers. However, all messages received by the switching nodes have the same priority and since all hosts communicate with the switching nodes, the switching nodes in turn, process lower priority applications at the same priority level as higher priority applications. This is not a problem with a single host computer system since requests can then be sent to the switching nodes according to the priority levels of the requests.

SUMMARY OF THE INVENTION

In accordance with the invention, each switching node in the system has multiple ports for node-host communications, all ports being connected to the host network. One of the ports in each switching node is designated as a primary or master port and it is used exclusively for communications with a primary host. Incoming messages on the master port are given the highest priority on the switching node and, the primary host is therefore preferred for applications that require high priority responses in the switching nodes.

The other ports in the switching nodes are secondary ports and they are used for communications with one or more secondary hosts. Since incoming messages on the secondary ports have a lower priority, the secondary hosts involve applications that perform query operations, switch monitoring and other applications that do not require high priority response in the switching nodes. The switching nodes process incoming messages at the primary ports with a higher priority than those arriving at the secondary ports. This automatically provides higher priority handling to higher priority tasks.

Although incoming messages on the primary port have higher priorities than incoming messages on the secondary ports, the fairness algorithms often used in priority arrangements do not process higher priority tasks to the complete exclusion of lower priority tasks. A switching node may therefore be overloaded in some situations and fail to respond to higher priority applications as speedily as required. Therefore, we prefer to provide the primary host with overall control of communications with the switching nodes, including those that are transmitted to the secondary ports.

Specifically, the primary host can disable port communications at any of the switching nodes. This terminates host-node communications with the designated ports. It thus ensures that the affected node can catch up with time-critical tasks, such as call setup, that have fallen behind. The primary host can later re-enable the affected port when the switching node has sufficiently reduced its backlog of high-priority tasks.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
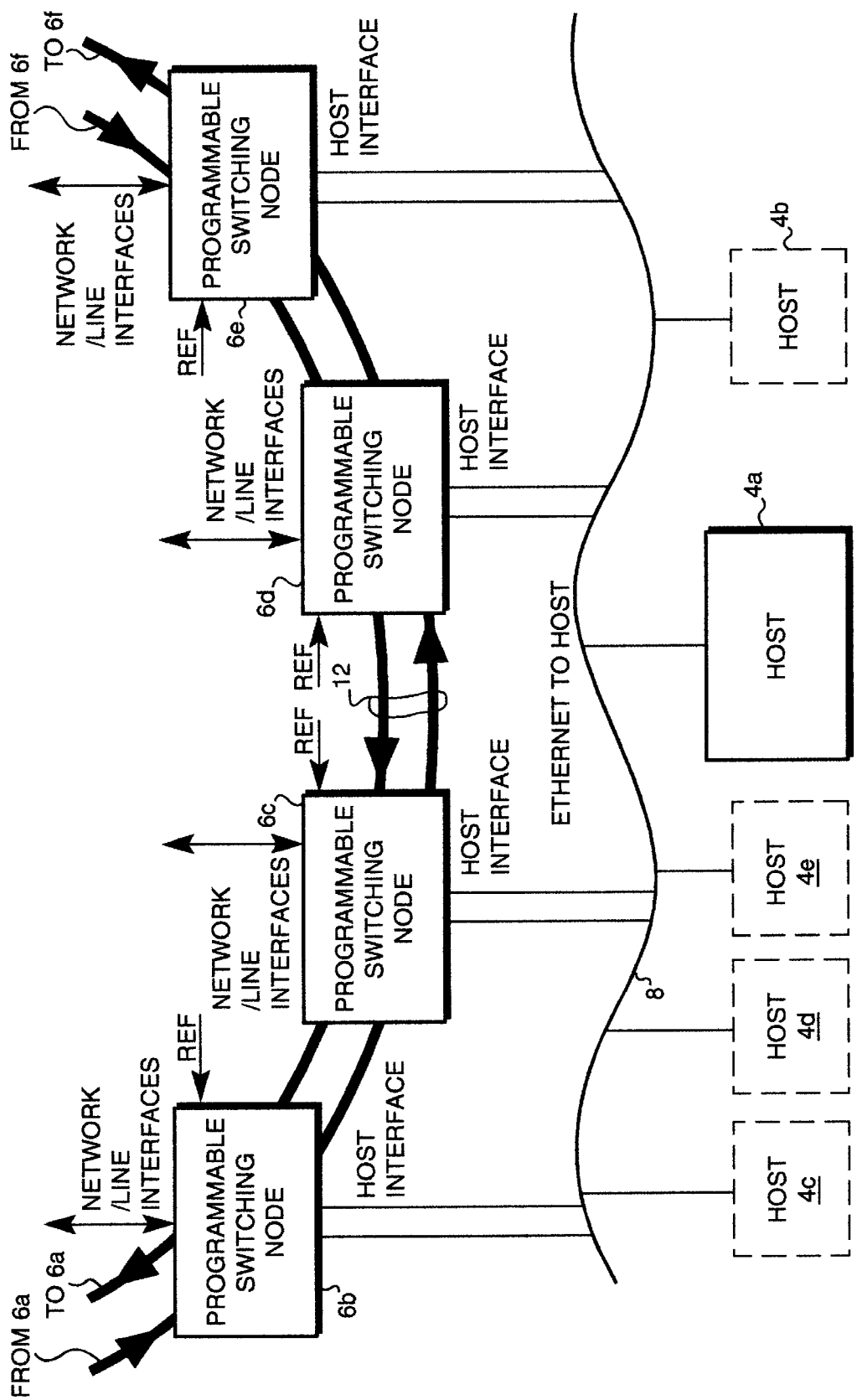
FIG. 1 is a fragmentary diagram of a switching system to which the present invention may be applied.

As shown in FIG. 1, a typical switching system to which the invention applies comprises a plurality of switching nodes 6b–6e connected by a ring-like internodal switching network 12. Each of the switching nodes is associated with a plurality of network/line interfaces which provide connections between the switching system and subscribers' lines, for example, and also with other switching systems such as the PSTN. Overall supervision, i.e. control and monitoring of the switching functions of the network 12, is provided by supervisory applications on host computers 4a–4e that are linked to the switching nodes 6b–6e by a host network 8 which, in the illustrated example, is an Ethernet network. Supervisory host applications 5a–5e are divided among the multiple computers 4a–4e. In accordance with the present invention, each switching node 6b–6e has multiple host ports that connect to the host network 8.

Figure 2:
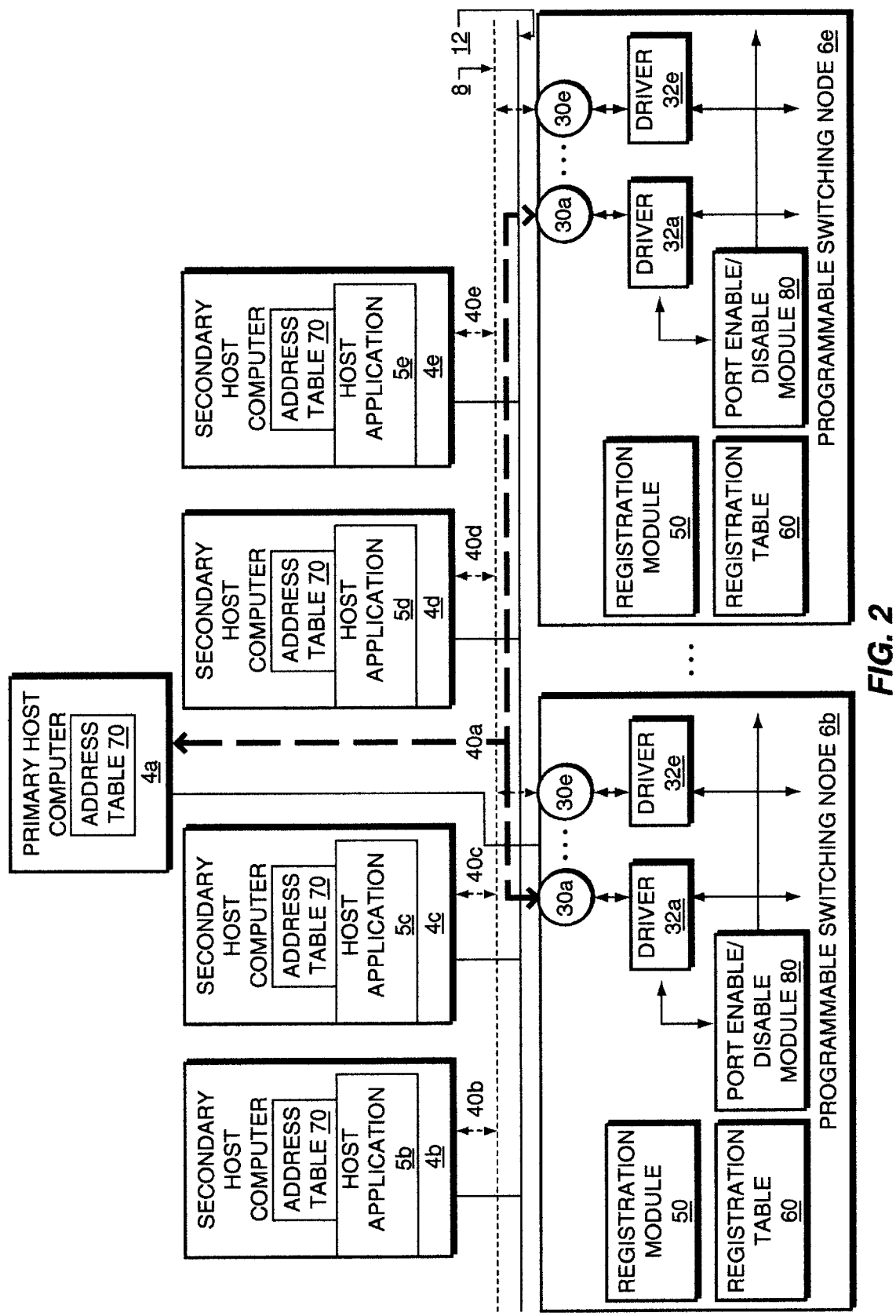
FIG. 2 is a diagram of a multiple-host/switching node configuration in accordance with the present invention.

As shown in FIG. 2, each switching node has a primary network port 30a and one or more secondary network ports. In the preferred embodiment of the invention, each switching node 6b–6e has five host network ports 30a–30e. The primary port 30a in each switching node 6b–6e is used exclusively for communications between the switching node and a primary host 4a. The secondary ports 30b–30e in each switching node are used for communications between the switching node and the respective secondary hosts 4b–4e. The host applications on the host computers 4a–4e establish virtual connections 40a–40e with the applications (not shown) on the switching nodes 6b–6e over the host network 8. These connections are preferably TCP socket connections.

Preferably, there is a one-to-one correspondence between each secondary host application and a secondary port on each switching node. Each of the drivers 32b–32e for the secondary ports can then be arranged to deal specifically with a single host application, in terms of the node software and/or hardware components (not shown) with which it interacts and in terms of the destination of outgoing communications from the port.

Incoming messages on the primary port 30a receive the highest priority in each switching node. Thus, the primary host 4a is preferred for supervisory applications that require high priority responses from the switching nodes 6b–6e. The primary port driver 32a is configured for exclusive communication with the primary host 4a and the secondary port drivers 32b–32c are configured to communicate with the hosts 4b–4e. All communications between the switching nodes and the secondary hosts 4b–4e thus pass through secondary ports 30b–30e and all communication between the switching nodes and primary host 4a pass through the primary port 30a. Thus, if a secondary host 4b–4e tries to communicate with a switching node through a primary port 30a, the switching node will reject the incoming message and return an error message to the originating host. Also if a secondary host 4b–4e tries to initiate a switching node task that is exclusively controlled by the primary host 4a, the switching node will return an error message.

In some situations, a switching node may be overloaded and fail to respond to higher priority applications as speedily as required. Therefore, the system operator may use the primary host 4a to exercise overall control over host-node communications. More specifically, the primary host 4a can disable secondary port communications at any of the switching nodes. This terminates host-node communications with the designated ports and it ensures that the affected node can catch up with time critical tasks that have fallen behind. The primary port 4a may later enable the affected port when the switching node has sufficiently reduced its backlog of high priority tasks. The primary host 4a may also shut off all host-node communications by disabling communications on the master ports 30a and the secondary ports 30b–30e.

In addition to controlling the ports, the primary host 4a also exclusively controls the way each switching node 6b–6e responds to polls about its current state. Instead of immediately responding to each poll message, the primary host 4a may instruct the switching nodes 6b–6e to broadcast poll response messages at predetermined intervals to the all hosts 4a–4e. In addition to supervisory applications, the primary host 4a processes all switch-initiated messages that cannot be sent to any of the secondary hosts 4b–4e. This occurs when the secondary hosts 4b–4e are not configured to handle a specific switch-initiated message or when the secondary host 4b–4e assigned to the message is down.

During message processing, the switching nodes 6b–6e queue host-initiated messages for each message type. A switching node 6b–6e returns a message error if a host 4a–4e tries to send more messages when the switching nodes corresponding queue is full.

It will be apparent that the invention provides for highly flexible control of a switching network, that is, it facilitates configuration and modification of the supervisory function by the system operator. Specifically, it facilitates adaptation of this supervisory configuration according to network traffic, geographic locations and other relevant factors.

What is claimed is:

1. A communications network comprising:

A) a plurality of switching nodes each of which provides connections between the communications network and subscriber lines or other switching networks;

B) an internal network interconnecting the switching nodes for conveying switched telecommunications data between them;

C) a primary host computer and at least one secondary host computer that run supervisory host applications with different priorities, the host applications exercising supervisory control over the nodes, and the primary host computer running a host application with higher priority than the host applications on the secondary hosts;

D) a host network linking each host computer with the switching nodes;

E) each node having a host-node interface means comprising a plurality of host network ports for establishing virtual connections between applications running on one of said host computers and applications running on said node, and one of said host network ports being a primary port and the remaining host network ports being secondary ports for communications with the host computers connected to the host network;

F) means in each switching node for assigning higher priority to incoming messages received on the primary port than the messages received on a secondary port; and G) means for restricting the primary port to communications between the switching nodes and the primary host.

2. The communications network of claim 1 including host-node port control means in each node for responding to port-control messages received at the primary port of that node, said control means disabling and/or enabling communications through one of said secondary ports.

3. The communications network of claim 2 wherein the primary host comprises means for exercising overall control over communications between the primary and secondary hosts and the switching node.

4. The communications network of claim 3 further comprising:

A. means for registering the primary and secondary hosts with the switching nodes after the system starts up;

B. means for configuring the primary port through a primary port driver for exclusive communication with the primary host; and C. means for configuring the secondary port through a secondary port driver for communication with the secondary host.

5. The communications network of claim 4 wherein the registration messages from the hosts are stored in registration tables in each node and said registration messages inform the node of the type of switch-initiated messages that each host processes.

6. The communications network of claim 5 wherein the primary host further comprises means for processing all switch-initiated messages that cannot be sent to secondary host.

7. The communications network of claim 6 wherein each switching node queues incoming host-initated messages and matches results with the queued messages in order to determine the originating host.

8. The communications network of claim 7 wherein the primary host further comprises means for exercising exclusive control over the way each node responds to host-initiated polls about the state of that node.

9. The communications network of claim 8 wherein each switching node returns error messages to hosts sending host-initated messages when its message queue is full.

10. A method of processing incoming messages in a communications network, said network having at least one switching node connected by a host network to a primary host computer and to at least one secondary host computer, each host computer having software applications with different priorities that exercise supervisory control over the nodes, said method comprising the steps of:
    implementing in each node, a host-node interface comprising a plurality of host network ports for establishing virtual connections between applications running on one of said host computers, and applications running on said node;
    designating one of said host network ports to be a primary port and the remaining ports to be secondary ports;
    assigning a higher processing priority in each node to incoming messages received on the primary port;
    assigning a lower processing priority in each node to incoming messages received on a secondary port;
    restricting the primary ports to communications with the primary host; and
    processing incoming messages received on the primary port at a higher priority than those received on a secondary port.

11. The method of claim 10 wherein the primary host exercises overall control over communications between the primary and secondary hosts and the switching node by the steps of:
    A. disabling port communications with hosts connected to an affected port; and
    B. re-enabling port communications with hosts connected to the affected port.

12. The method of claim 11 further comprising the steps of:
    A. registering the primary and secondary hosts with the switching nodes after the system starts up;
    B. storing registration messages from the hosts to the node in registration tables;
    C. using the registration messages to inform the node of the types of switch-initiated messages that each host processes;
    D. configuring the primary port through a primary port driver for exclusive communication with the primary host;
    E. configuring the secondary port through a secondary port driver for communication with the secondary host; and
    F. queuing incoming host-initiated messages, processing each message in the queue and matching results with the queued messages in order to determine the originating host.

13. The method of claim 12 further comprising the step of processing in the primary host all switch-initiated messages that cannot be sent to secondary host.

14. The method claim 13 for exercising exclusive control over the way each node responds to host-initiated polls about the state of that node by the step of sending port-control messages from the primary host to each node.

* * * * *